Dec. 31, 1940.　　　　J. W. PAYNE　　　2,227,416
TREATING PROCESS
Filed Feb. 28, 1940　　　5 Sheets-Sheet 1
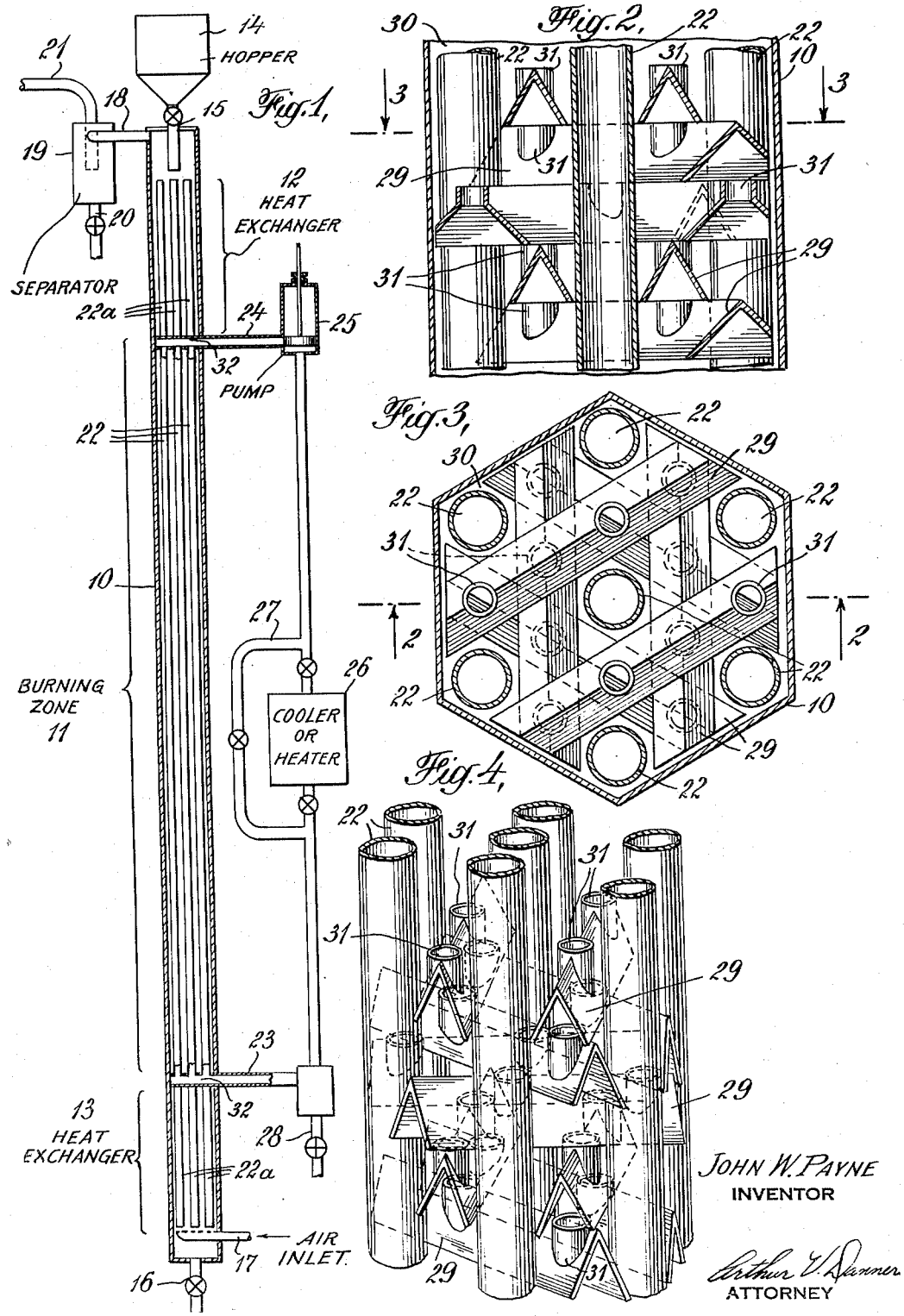
John W. Payne
INVENTOR
ATTORNEY Dec. 31, 1940.  J. W. PAYNE  2,227,416
TREATING PROCESS
Filed Feb. 28, 1940   5 Sheets-Sheet 2
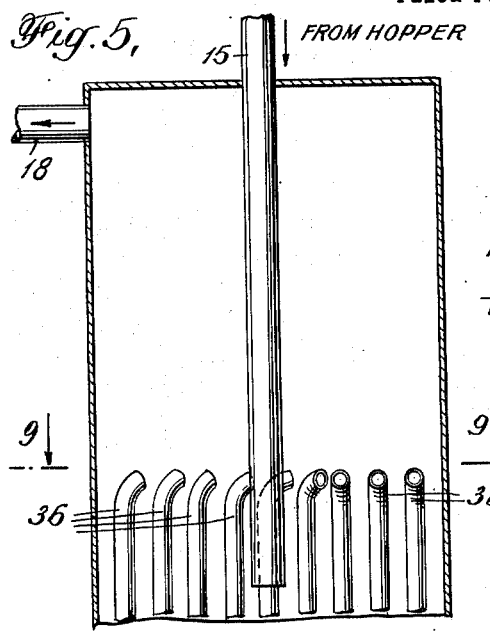
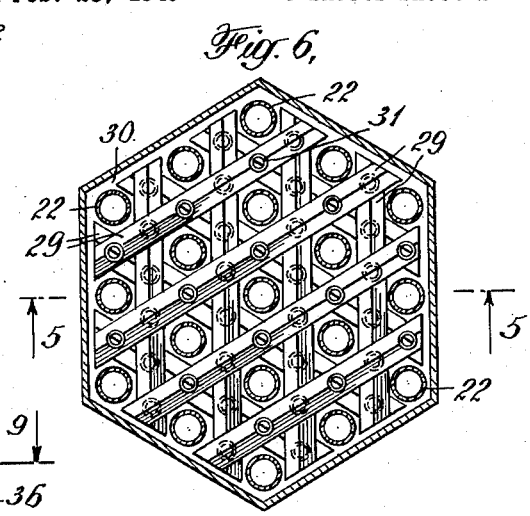
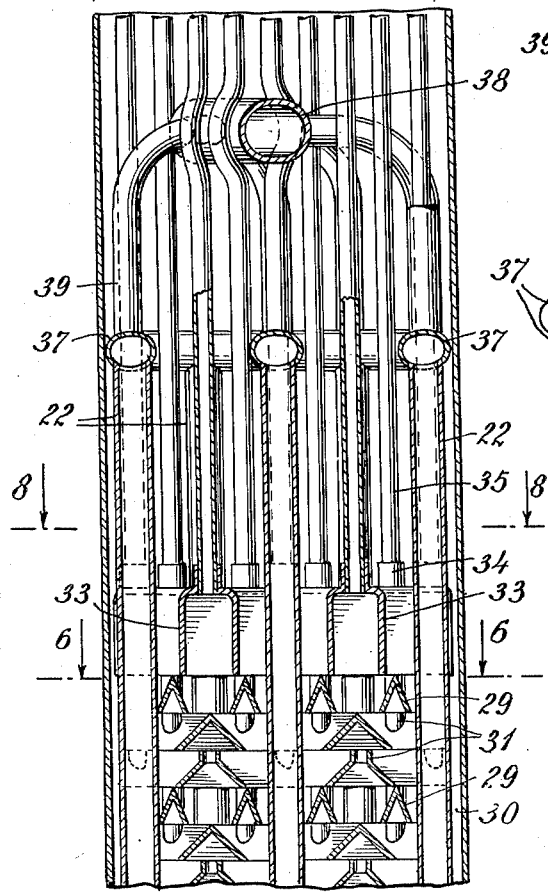
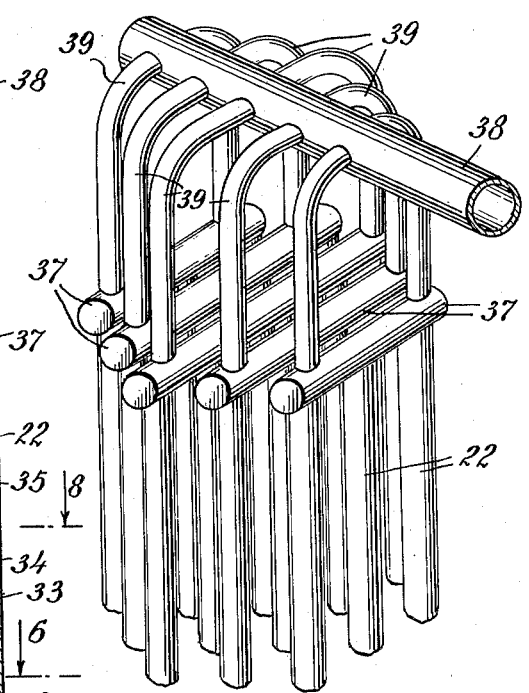
JOHN W. PAYNE
INVENTOR
BY
ATTORNEY Dec. 31, 1940.  J. W. PAYNE  2,227,416
TREATING PROCESS
Filed Feb. 28, 1940  5 Sheets-Sheet 4
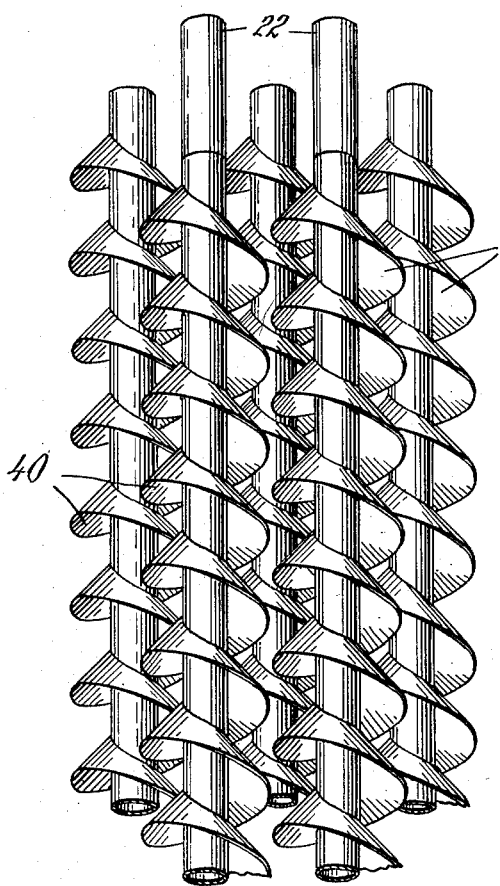
Fig. 10,
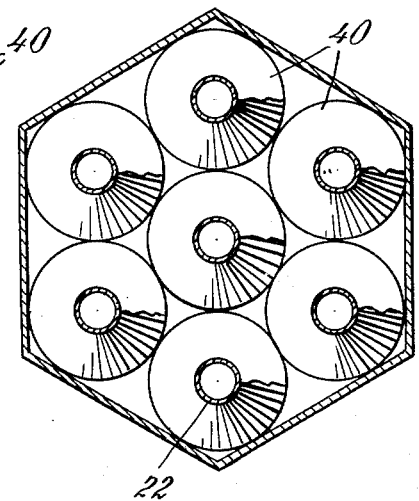
Fig. 11,
John W. Payne
INVENTOR
BY
Arthur T. Danner
ATTORNEY Patented Dec. 31, 1940

2,227,416

UNITED STATES PATENT OFFICE 2,227,416

TREATING PROCESS

John W. Payne, Woodbury, N. J., assignor to Socony-Vacuum Oil Company, Incorporated, New York, N. Y., a corporation of New York Application February 28, 1940, Serial No. 321,164

9 Claims. (Cl. 252—281)

This invention relates to the treatment of finely divided solid materials in the presence of gases or vapors and/or heat at closely controlled temperatures. The invention particularly relates to the regeneration of spent adsorbent type materials such as clays, activated clays, synthetic alumina-silica compositions, bauxite and the like which have been used in processes tending to exhaust the utility of the adsorbent by clogging, coating or impregnating it with liquid or solid materials of a combustible nature, as, for example, oily, tarry, or carbonaceous materials and which is regenerated for re-use by the application of heat to the spent adsorbent resulting in the driving off or burning off of inactive impurities. This application is a continuation-in-part of my co-pending application 210,150, filed May 26, 1938. Suitable apparatuses for carrying out my present invention such as those disclosed herein form the subject matter of my co-pending application Serial Number 279,008, filed June 14, 1939, which, in turn is a continuation-in-part of my application Serial Number 210,150.

In regeneration of petroleum filter clays, for instance, as carried out today, the clay suffers a loss in efficiency with each burning or regeneration until finally it cannot be regenerated to a sufficiently high activity to warrant further regeneration, at which time the clay is discarded to waste. Since clays which have had a different number of burnings have different efficiencies, they are usually kept separate and separately classified. In general filter clays are only regenerated about five to eight times and practically never more than ten to fifteen times before they are thrown away.

The problem of regenerating clays is complicated by the sensitivity of the clays to high temperatures. While temperatures around 900° to 1150° F. are desired to burn off impurities from the clay, temperatures around 1300° F. may permanently injure the clay. Moreover, if the temperature falls too low, inefficient regeneration results. The problem of keeping the temperature of the clay within safe limits is greatly increased since the combustion reaction involved in burning off the impurities evolves considerable amounts of heat and can very easily become so rapid as to get beyond control temporarily, either generally or locally. Probably one of the principal reasons for the successive losses in activity of regenerated clay is the fact a certain amount is overheated or underheated each treatment. In view of the fact most clays to be regenerated have more than enough carbonaceous material deposited thereon to furnish the heat required for regenerating, it is quite probable that present methods in general permit overheating; this appears to be true, moreover, from the fact it would be extremely difficult to control precisely the temperature of all the clay in present methods.

In the past various methods have been devised for carrying out the regeneration of spent filter clay. One of the first employed merely an open hearth upon which the clay was spread and burned. Today there are three principal types of burners in general use. In the first type the clay falls or cascades over baffles set at about a 45° angle through a flue countercurrent to gases of combustion. In the second type the clay is regenerated in a rotary kiln slightly inclined from the horizontal. In the third type, which probably is the most commonly used, multiple hearth burners are employed. These multiple hearth furnaces or burners are substantially the same as used in the roasting of ore and are of either the Nichols-Herreshoff or wedge type. In these burners the clay is slowly rabbled across each hearth, dropping from one to another until the bottom hearth is reached. In all of these commonly used burners the temperature is controlled principally by adding steam or water, cutting the fires, regulating clay feed rate and regulating the concentration of oxygen passed into the burner and therefore the rate of oxidation.

The kilns or burners which are now in common use are relatively inefficient because of absence of proper temperature control for preventing overburning of clays, comparatively small throughput per unit volume of burner, and inefficient utilization of the heat developed in burning the oil or other carbonaceous matter left on the clay, thus requiring considerable quantities of additional fuel to complete combustion.

Other apparatuses and methods have been proposed but have not displaced the three above-described burners to any appreciable extent. This very fact that other burners have not been taken up by the art is believed conclusive that each one suggested is subject to limitations which prevent regenerations as efficient as, or at least any more efficient than, those already enjoyed by the art. While such a fact is not usually so conclusive, it is believed to be in the present case in view of the tremendous amounts of clay used and thrown away each year and the increased amount that is necessary because of the successive loss in efficiency. Moreover, in view of the fact that clays and like materials are not used in just one industry but in many, with a universal desire existing for improvement, it is believed impossible that any method which effects any substantial improvement over those now employed could go unnoticed and undeveloped. This view may well be appreciated when it is realized that a single lube oil refinery in the petroleum industry alone may regenerate over 75,000 tons of filter clay each year.

As a result of my research I have striven to devise a method which would be commercially feasible for handling large quantities of clay and would permit burning off of inactive impurities from the clay at optimum temperatures while at the same time affording such constant uniform heat control of all the clay under such closely controllable temperature conditions that substantially none of the clay would be subjected to a deleterious temperature. It is believed the improved results I obtain with my present method are largely due to the fact that this method permits burning of clay under substantially these conditions. For the same reasons, my present process may be used with advantage in processes in general wherein finely divided solids are treated at closely controlled elevated temperatures.

It is an object of my invention to provide a method for the elevated heat treatment of a moving stream of finely divided solids which permits uniform temperature control over each solid being treated throughout the period of its treatment.

Another object is to provide a method of conducting a treatment wherein a moving stream of solid particles is directly contacted with gases or vapors which method affords a uniform temperature control over each solid particle throughout its presence in the treatment and makes proper provision for passage of the gases or vapors through the solid particles.

A more specific object of the invention is to provide a method for subjecting a stream of porous adsorptive material of relatively small particle size, or other small particle size solids, to a heat treatment wherein the adsorptive material flows countercurrent to gaseous medium in substantially a solid column of particles with proper gas paths formed therethrough and a uniform temperature control is maintained over each particle throughout its period of treatment.

Still another specific object of the invention is to provide a practical method for regenerating a moving stream of spent adsorptive material such as filter clays and the like having carbonaceous impurities deposited thereon by reacting said carbonaceous impurities with a gaseous oxidizing medium which method suitably flows the adsorptive material countercurrent to the gaseous medium and controls the temperature of the adsorptive material such that efficient regeneration will be effected without subjecting the material to deleterious temperatures.

An important object is the continued regeneration of filter clays to a higher efficiency than heretofore obtained which substantially eliminates progressive degradation in efficiency with successive regenerations.

Another object is the provision of a method capable of accomplishing high unit throughput per unit of capital invested and space occupied.

An important object is the provision of a method capable of being carried out in an apparatus having few moving parts and capable of easy and economical maintenance and operation.

A further object is the provision of a method which permits more efficient utilization of the heat developed in the apparatus. These and other objects will appear from the following description of my invention.

In my present invention, treatments comprising the contacting of solid particles and gaseous agents at elevated temperatures are conducted by flowing the particles through a treating zone wherein every solid particle throughout its entire presence in the treating zone is maintained within sufficiently close proximity to, but out of contact with, a sufficient amount of properly temperature-controlled, circulating fluid heat exchange medium that the temperature of each and every solid particle while in the treating zone is kept within a proper treating temperature range without any deleterious temperature occurring. Furthermore all of the solids are flowed substantially the same distance through the treating zone so that the treatment will be substantially uniform, and, in order to properly contact the solids and the gaseous agent in the treating zone, suitable provision is made for passage of the gaseous agent through the zone without causing channeling, whereby gaseous agent flows in a stream by itself without sufficient contact with the solids, and so that the gaseous agent may flow through the solids without unduly disturbing their general direction of flow.

Thus the present invention may be used in the treatment of finely divided solids in general in order to change their physical or chemical character or both. Particularly typical of materials that may be treated by my invention are those spent filter clays or other adsorbents derived from the filtration of mineral oil products such as waxes, turbine and transformer oils and particularly the usual lubricating oils; or from filtration of vegetable oils; sugar liquors; etc., which spent clays or other adsorbents contain adsorbed combustible materials such as tarry, oily or carbonaceous matters and are regenerated for reuse by the heating or burning of the combustible material adsorbed thereon. In some instances it may be desirable to burn off only inactive carbonaceous impurities while carbonizing a part of the carbonaceous impurities to form an active carbon layer on the adsorbent.

Other typical materials which may be treated are catalytic materials composed of solid particles which have been used in some catalytic process of refining or conversion until sufficiently contaminated with impurities that regeneration or revivification is required or desirable and wherein the inactive impurities deposited on the catalyst are removed by treating the catalytic material at elevated temperatures. For instance, in the catalytic cracking of petroleum oils using a finely divided solid catalyst material, e. g., clay-type catalysts, the catalyst becomes contaminated with a carbonaceous deposit of the nature of coke which must be removed from time to time in order to regenerate the catalyst, and this removal is usually effected by burning off the impurities at closely controlled elevated temperatures. Such catalyst treatments involve special problems and form the subject matter of the co-pending application S. N. 321,184 filed February 28, 1940.

For convenience the present process will be described in detail with respect to regeneration of filter clay. However, it is to be understood the invention is not limited thereto but is directed to the whole field of regeneration of spent adsorbents by burning off inactive impurities as well as to the initial preparation of same, when necessary, including activating, drying, hardening and the like by the application of heat. Likewise the present process, as has been stated, may be used to advantage for the heat treatment of solid particles in general, as, for instance, in roasting of ores, certain drying processes etc., showing decided advantages for treatments wherein close temperature control is a necessity or a highly desirable condition and reactions are involved which produce or consume a considerable amount of heat.

In order that the invention may be readily understood, reference is now made to the accompanying drawings showing preferred embodiments of means for carrying out my present process and wherein:

Fig. 1 is a general schematic drawing of one embodiment of an apparatus suitable for carrying out my invention;

Fig. 2 is a vertical section of a portion thereof;

Fig. 3 is a cross-section on the line 3—3 of Fig. 2;

Fig. 4 is a perspective view of typical interior arrangements within the apparatus;

Fig. 5 is a part elevation in section of an alternate form of apparatus suitable for carrying out my invention which omits the heat exchanger zones shown in Fig. 1;

Fig. 6 is a cross-section on the line 6—6 of Fig. 5;

Fig. 7 is a perspective view of a preferred header structure for the heat transfer tubes of the alternate form shown in Fig. 5.

Fig. 10 is a perspective view of a portion of another alternate form of an apparatus suitable for carrying out my invention showing an optional form of baffle structure, the view being taken at an angle somewhat below the horizontal looking up underneath the baffles;

Fig. 11 is a horizontal cross-sectional view of an apparatus containing internal structure of the type shown in Fig. 10.

Figure 8:
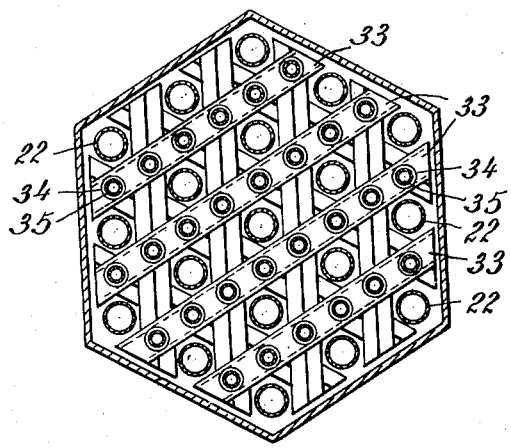
Fig. 8 is a cross-section taken on the line 8—8 of Fig. 5.

Referring to Fig. 1, 10 indicates a burner or kiln in which there is housed a burning zone 11, a preheating zone 12, and an after-cooler 13. Spent adsorbent or other solids to be treated, stored in hopper 14 is fed to the upper end of the regeneration apparatus through a throat 15, and thereafter the adsorbent passes downward through zones 12, 11, and 13, and is removed from the apparatus in revivified or treated condition by some device 16, which may preferably be a star wheel mechanism or some similar device for enabling the removal of adsorbent irrespective of the pressure maintained within the casing 10. Air, or other suitable gaseous agent, under pressure is fed through inlet 17 and passes upward through the casing 10 in countercurrent relationship to the descending adsorbent, passing successively through zones 13, 11, and 12. The air departs from the apparatus through outlet 18 and is led into separator 19, which is a dust separator, preferably of the usual well-known cyclone type wherein fines and dust, if any, are separated from the moving steam of air. These separated materials are removed from or returned to the system through pipe 20 and air or flue gas is finally discharged through pipe 21. It is obvious that these arrangements permit the operation within the case to be carried out at pressures below, near, or materially in excess of atmospheric pressure.

Within the case 10, the functions carried out within the three zones are as follows: In zone 13 incoming air is preheated by contact with burned adsorbent, the adsorbent at the same time being cooled. In zone 11 a combustion occurs in which the carbonaceous impurities are burned from the adsorbent. In zone 12 another heat exchange occurs in which the hot flue gases are cooled and preheat the incoming adsorbent. The rate and path of flow of air and adsorbent is so adjusted with respect to each other that the supporting effect of the rising column of air does not interfere with the uniform downward flow of the column of adsorbent. Optimum conditions are reached when the velocity of air is quite high and in most cases it appears to be preferable that the velocity of the air is just short of that which will prevent uniform progress of the adsorbent through the apparatus. In the event a combustible material such as bone char is being regenerated, an inert gas, if any, will wholly or largely replace air and regeneration effected by heat alone, the inert gas "sweeping out" the vaporized impurities being preferably introduced into the apparatus in the manner disclosed for the air. In case other gases are used in place of or in addition to air, they may be introduced through air inlet 17 or separate inlets may be provided.

In the regeneration of spent petroleum filter clays, for instance, as stated above, it may not always be desired to burn off all the petroleum carbonaceous impurities but rather only inactive impurities. This may be done by reducing the amount of air or concentration of oxygen to a sufficient extent to only burn off a part of the petroleum impurities, the remainder being carbonized to form an active carbon layer on the clay. The concentration of oxygen may be reduced by merely reducing the amount of air or by replacing a part or all of it with steam or inert gases. For some oils, notably solvent refined petroleum oils, yields from such carbonized clays are from two to four times as great as from the same clay regenerated by complete burning. The use of carbonized clays for filtering solvent refined oils forms the subject matter of a co-pending case Serial Number 275,673 filed May 25, 1939, and the carbonizing of petroleum filter clays by processes in general rather than only the particular one herein disclosed forms the subject matter of the co-pending application Serial Number 275,672, filed May 25, 1939.

When combustion occurs under the circumstances above outlined in the presence of spent absorbent containing carbonaceous impurities and air under pressure and in the absence of other agencies, there is a decided tendency to burning in a concentrated zone at extremely high temperatures, ruinous to most adsorbents. Likewise in operations in general of this type wherein there is a considerable consumption, evolution or application of heat there is a tendency for localized or even general over- or under-heating. In order to control this tendency and suppress it, the burning zone is equipped with heat transfer tubes 22, through which there is circulated a fluid heat transfer medium which enters by pipe 23, leaves by pipe 24, and is circulated under the impulses produced by pump 25. Headers 32 connect pipes 23 and 24 of the external circuit with tubes 22 and are of any suitable construction which permits the clay to gravitate on through the space between the tubes. In order that control of the temperature of this circulating heat transfer medium may be had, there is inserted in the external portion of its circuit a heat exchange means 26 which, dependent upon the requirements of the process being carried out, may effect either cooling or heating. This heat exchange means 26 is provided with a by-pass 27 to facilitate control of the temperature of the circulating heat transfer medium. To permit addition or withdrawal of heat transfer medium for such purposes, for example, as making up losses or shutting down the system, there is provided a pipe connection 28. Tubes 22a in the heat exchanger zones 12 and 13 serve merely as spacing tubes for baffles 29.

A most important feature of the invention and one upon which the successful carrying out of the operation is largely dependent, is the provision of a proper treating or burning zone. To properly carry out the steps of the operation disclosed herein using countercurrent flow, the adsorbent must pass at a practical rate through the treating zone in one direction and the air in the other direction without either being allowed to channel or flow in a stream by itself without sufficient contact with the other medium. Furthermore, since my process is particularly directed to treatments of relatively small particles, such as percolation clays, ores to be roasted, etc., which small particles pack together sufficiently that practically no gas voids are left between them, I have found that in order to successfully treat these small particles by my present process I must provide for suitable passage of the gas through the particles. In order to provide feasible passage, I baffle the gas and particles to form continuous, substantially particle-free passages for the gas which permits the gas therein to directly contact particles along at least one edge of the passages, or I at least redistribute the particles and gaseous agent at sufficiently frequent intervals that there is no such extended portion of downflowing particles up through which gaseous agent must flow as to cause difficulties, such as "boiling" of the clay, in these portions.

Therefore I have found that the structure of the treating or burning zones for carrying out my invention have two principal requirements, namely, suitable passage means for circulating fluid heat exchange medium and suitable baffle means for the solids and gaseous agent. The passage means should be so arranged as to keep temperature-controlled, circulating fluid heat exchange medium within sufficiently close proximity to each and every solid particle in the zone throughout their entire presence in the zone that proper temperature control of each particle may be had. The particular arrangement or provision of the fluid heat exchange medium throughout the zone is especially important and will be discussed more in detail hereinafter. The baffle means should be such as to (1) cause all the solids to have about the same length of flow through the zone, (2) redistribute the gaseous agent and solids so as to prevent channeling, (3) aid in heat transfer (4) provide adequate passageway for the gaseous agent up through and in contact with solids, and (5) force the gaseous agent to take such a route through the zone that high rates of gas flow may be used without having any undesirable effect on the general direction the solids are moving. The functions of the baffle means set forth in (4) and (5) are increasingly important the finer the particle size of the solids.

Several structural means may be devised whereby the above requirements may be provided. Accordingly it is to be clearly understood that the present process is not to be restricted to the particular structural means shown and described for illustrative purposes for carrying out the process. Particularly convenient means and one relatively cheap is that internal arrangement which is shown in Figs. 2–6, 8 and 9. In this arrangement, there are shown the vertical heat exchange medium carrying tubes 22, and between those tubes there are shown various short pieces of light angle iron designated 29. These pieces of angle iron are so arranged that their length is placed horizontally and their angle is open downward. Placed in this manner between the heat exchanger tubes 22, each layer of angle irons 29 being disposed transversely to those on the layer below, each angle iron serves to receive the adsorbent descending from above and to distribute that adsorbent laterally in planes at an angle to those planes in which the adsorbent was moving when it first encountered the particular angle iron in question. Also the form and placement of these angle irons and the manner in which they surround the heat exchange tubes 22 causes adsorbent in its downward flow to repeatedly pass through the annular space 30 (see Figure 3), which annular space 30 surrounds the heat transfer medium tube and brings the adsorbent into even closer heat transfer relationship with the heat transfer medium in said tube.

Ascending air is trapped beneath each piece of angle iron. To prevent its flow being concentrated at the ends of the angle irons against the walls of the chamber, each angle iron is pierced at several points along its heel forming a series of orifices 31, these orifices being so located that those in one angle iron will be directly below the closed part of the next above angle iron which crosses this part of the first-mentioned angle iron. In this manner each orifice distributes air into the space beneath the angle iron above it, yet air cannot pass directly upward through another orifice. In short, the arrangement is such that these orifices when assembled are not in register. It will be seen that by this arrangement gas passes up through the chamber in a tortuous, substantially particle-free path but that the gas is in direct contact with the particles flowing along the bottom boundaries of the gas passages. The result of this arrangement is a very effective distribution and redistribution of both downflowing absorbent and upflowing air, coupled with an effective bringing of the adsorbent into heat transfer relationship with the heat transfer medium flowing within tubes 22. Furthermore as stated hereinabove the use of relatively high air velocities are desired for practical regeneration. One of the prime features of baffles 29 is that they permit the use of rather high air velocities without "boiling" or blowing the clay or other material out of the apparatus. While baffles might be arranged so that gas would have to pass directly up through small portions of particles, the sheltering of the path and redistribution of the particles should be frequent enough that the gas passes through such portions with no substantial difficulty such as "boiling" of the clay.

Figure 9:
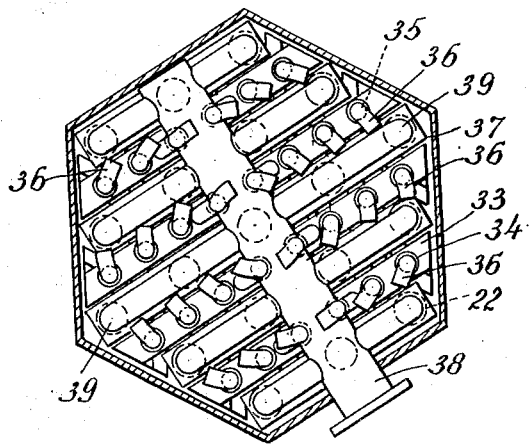
Fig. 9 is a cross-section taken on the line 9—9 of Fig. 5.

In Fig. 5, I show part of a modified form which differs from the apparatus of Fig. 1 in omitting the two heat exchanger zones at each end. Since the heat exchanger zones are not absolutely essential for successful operation and since careless operation might permit burning in these zones which are not provided with fluid heat exchange medium, it may be found more practical at times to use this form of my apparatus, which omits the heat exchanger zones. In Fig. 5, I also show channel members 33 which are placed transversely across the top row of angle irons, covering in row form the orifices 31 opening to the top of the chamber and thereby collecting the rising air (see Figs. 8 and 9). Channel members 33 are provided with orifices 34 to which are attached pipes 35 which lead upwardly to a point above the clay inlet opening of the throat 15 of hopper 14. This latter arrangement prevents the rising air from blowing the newly entering clay, which is above the angle irons, out of the chamber. A further feature of air pipes 35 is shown in Figs. 5 and 9, namely, the curved upper ends 36. Thus the upper ends of all of the air pipes 35 are bent outwardly in such fashion as to force the emerging air to flow in a rotary manner thereby forming a centrifugal separator within the chamber, and, as a consequence of which the finely divided particles or dust carried by the air are separated out and drop back down while the particle-free air passes on up and out flue 18. It is to be understood, of course, that if desired the air pipes 35 might lead up to the flue or outlet and an external separator used as shown in Fig. 1.

In Fig. 7, I show in detail a preferred header structure which is particularly suitable for an apparatus such as shown in Fig. 5. As shown separate pipes 37, serve as manifolds to connect up rows of heat exchange tubes 22. Manifolds 37 are all in turn connected to a single master manifold pipe 38 through curved pipes 39. The master manifold pipe 38 connects with pipe 24 (see Fig. 1) of the external heat transfer medium circuit. A similar header at the bottom of the chamber connects with pipe 23 of the external circuit.

As stated above, several structural means may be devised for effecting the desired baffling when treating a flowing stream of small particles with a countercurrently flowing stream of gas. In Fig. 10 I show another baffle structure comprising winding fins which may be used in place of the angle iron baffles shown in the other cases. In fact, the fin baffles of Fig. 10 have certain advantages over the angle iron in that being welded to the tubes they give greater heat exchange surface to the tubes themselves, and, moreover, this fin structure has certain advantages from the construction standpoint.

In Fig. 10, tubes 22 are provided in a manner similar to that shown in the other cases which provide tubes, but instead of placing angle irons between the tubes, a metal fin 40 is welded to each tube, the fin being wound continuously along the tube as shown. It will be seen in Fig. 11 that the external peripheries of the fins 40 of adajacent tubes are in vertical alignment. From what I have disclosed herein it will be apparent that for best results these fins should be either so arranged or actually overlapping. In other words, there should not be any substantial cross area in the kiln above and below which, in a straight vertical line up through the length of the burner, there is no baffling, since otherwise there would be "short-circuiting" of the clay in this area, and the clay in the center of this area might not be kept sufficiently close to heat exchange surfaces. Of course, there might be a slight amount of this vertically free area before appreciably inferior results are encountered.

The object of having the fins wind along each tube is to provide winding substantially particle-free gas passageways up through the case underneath each fin which permit gas therein to directly contact the particles along at least one edge of the passageways. While the fins are shown as uniform helical baffles they may be of any equivalent structure which affords the desired result.

In the preferred operation the particles fill the case, moving therethrough in substantially a solid solumn of particles, and thereby form an outer side wall to the gas passageways where the gas and catalyst are in direct contact. A further feature may be provided by using baffles of mesh wire construction, the mesh of which is too fine to permit passage of particles, and, thereby, the burning or reacting surface of the chamber is practically doubled since the burning or treating not only occurs along the above mentioned "outer side wall" but also along the face of the baffles that the particles move over.

While the fins might be positioned at right angles to the tubes or even slanted slightly upward, most efficient results are had by slanting the fins downwardly to give them a slope which is at least as great as the angle of repose of the particles being used. On the other hand the slope should not be too great, as the size of the gas passage is thereby reduced. I have found a slope of about 45° to be quite satisfactory for most uses. The pitch of the continuous spiral or helical fin should not be so great that the particles more or less fall straight through the case, but rather should be at a more moderate pitch so that the particles substantially ride the baffles. Also if the pitch is too great no air passage is provided. It may be found of advantage to have adjacent fins of opposite winding so that particles riding down thereon will be traveling in opposite directions, collide and thereby effect more thorough redistributing.

The size of the particles that may be treated in my process is limited by the air velocity required for feasible operation. For this reason clay particles treated should be of a granular nature for best results, for intsance, 100 mesh or larger, as otherwise trouble may be encountered in obtaining a uniform downward flow of the solids. The invention is particularly feasible for regenerating filter clays of around 30–60 mesh. However it is to be understood the invention is not restricted as to the exact size of the particles but rather to the general application of the process herein disclosed to solid particles of any size wherein the objects of the invention are attained, particularly since particles of different materials, e. g., particles of ores to be roasted and spent porous particles to be regenerated, may vary appreciably in weight for the same size. Since the heat transfer in the present process should be partially by conductance, the treating zone, for best results, should be filled with the solid particles which then gravitate in a more or less solid column through the apparatus.

An important feature of the present invention is the proper use of fluid heat exchange medium and the structure whereby the solids are intimately contacted with counter flowing gases while each individual particle of the solids, during substantially the entire duration of the reaction, is within sufficiently close proximity to the heat exchange medium that no deleterious temperature condition is created.

In order to obtain proper temperature control, the heat exchange medium must be adjusted to a proper temperature, for extracting or adding the necessary heat. Moreover heat exchange medium must be flowed in sufficient amount in close indirect heat exchange with every solid particle and then cooled or heated to readjust its temperature by means extraneous of the reaction heat before the medium's temperature reaches an undesired value. In this way the heat exchange medium in my invention continuously controls the temperature of the zone making immediate compensations for temperature changes whereby no deleterious temperatures occur.

When the operation is first started the heat exchange medium may add some heat to help initiate the reaction or treatment, or at least the medium should no be at such a low temperature as to substantially hinder such initiation. After the operation is started the exchange medium is circulated throughout the zone adding or abstracting heat as required. In my invention the heat exchange medium is maintained at all points in the regenerating zone at a temperature below temperatures which cause substantial damage to the clay (or if other operations are being conducted, below temperatures which cause heat damage thereto), and, of course, at a temperature above which undue cooling occurs so that the regeneration (or other treatment) can not proceed efficiently. For instance, in the usual regeneration of filter clays and the like we preferably maintain the heat exchange medium at a temperature around 850°–900° F. and never above about 1050° F. By so controlling the heat exchange medium and flowing a sufficient amount within sufficiently close indirect heat exchange with each particle, a close uniform temperature control is maintained over every particle so that no deleterious temperatures occur which cause injury to the particles or treating operation. Moreover the entire zone will be maintained under the same close uniform conditions.

While temperature-controlled, circulating gaseous heat exchange mediums of high specific heat might be used in some instances, I greatly prefer the use of liquid heat exchange mediums since necessary pumping and pressure facilities for proper use of even the best gaseous mediums, e. g., hydrogen, would, in many instances, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay, I prefer the use of fused salts. A particularly preferable mixture of this kind is a mixture of the alkali metal salts of nitric and nitrous acids. In certain cases suitable liquid heat exchange media might be found which have a boiling point around the desired operating temperature, in which case, the heat exchange medium, although mostly in the liquid state, might undergo some transition whereby advantage could be taken of its heat of vaporization or condensation. By the use of liquid heat exchange media and by having them in sufficiently close proximity to all particles undergoing reaction an extremely close and uniform temperature control may be maintained.

In the preferred practice the heat exchange medium is maintained at substantially the temperature of the treatment being controlled, e. g., above the minimum temperature at which proper treating is obtained and below the minimum temperature at which undesirable heat injuries occur such as substantial damage to the particles or reaction. Such practice may be carried out effectively when the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and suitable cooling or heating of the heat exchange medium and its circuit maintains the liquid at the treating temperature. Thus if a sharp brief rise in temperature occurs which normally would damage the clay before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise if the temperature fell off sharply so that normally the temperature would go so low that inefficient regeneration would result, this fluctuation likewise would be immediately and automatically offset by the liquid heat exchange medium which would add heat to the cooling granules. A further advantage in this practice results from the complicated structure of apparatuses for affording proper temperature control. The structure involves an exposure of tremendous amounts of heat conducting walls. When two widely different temperatures are maintained on different sides of these walls thermal expansion difficulties may arise causing buckling, etc. However when substantially the same temperature is maintained throughout, the apparatus operates without strain or difficulty.

As a result of the close uniform temperature control afforded by my process many important advantages are obtained. For instance, the process of regenerating spent filter clays by burning is substantially revolutionized. Thus in my process, since I provide adequate temperature control, I preferably use not substantially more than the theoretical amount of air or oxygen to burn the carbon as contrasted to prior methods which use large excesses of oxygen. As a consequence the carbon on the clay or adsorbent usually furnishes all the necessary "fuel" for burning so that no additional fuel need be added, and quite in contrast to prior methods, my heat exchange medium may either extract or add heat to the clay. To offset overcooling and to heat the portion not under combustion in the prior processes, there have been various suggestions of heating indirectly with hot combustion gases. It is to be noted however that these exchange mediums add heat rather than extract, and, moreover, being at high temperatures, above clay-damaging temperatures, they subject the clay to additional dangers.

In some treatments, as for instance, in carbonizing some clays, the reaction or treatment may not give out sufficient heat for its needs or it may even be endothermic. In such a case my heat exchange medium will supply heat to the operation rather than extract heat, nevertheless, the principles are the same with the medium being heated by the "extraneous" means rather than cooled and as before always maintained below temperatures which cause heat damage to the clay or other material or treatment being conducted.

As has been indicated hereinabove, one of the important features of the present invention is the provision of a treating zone whereby the circulating fluid heat transfer medium may be maintained at all times within sufficiently close proximity to every granule in the burning zone that no deleterious temperatures will be created. Obviously this maximum distance that each granule might be from the heat transfer medium may vary with the materials treated, the atmosphere in the burning zone, the reaction being carried out, the amount of impurities being burned, mass velocity of air, physical properties of the liquid heat transfer medium, etc. Accordingly it would be difficult to specify the maximum distance that may be used for every operation to which my apparatus may be put. However, in general, this distance should not exceed about 1½ to 2 inches in order to afford proper temperature control, a distance of 1½ inches being well suited to the regeneration of clay. Furthermore, it has been found that the volume expressed in cu. in., that may be occupied by the clay or other material should be about ¼ to 3 times the area of heat transfer surface, expressed in sq. in., (exclusive of the angle irons or other baffles). In the regeneration of fullers' earth it is preferred to maintain this ratio within the range of about ½ to ⅔.

With the above guides, the concept that the clay or other material is to be passed through a zone of substantial length to afford proper contact time with each particle in sufficiently close proximity to the heat exchange medium that no deleterious temperature will be created at any point and the further concept that the burner is to be provided throughout with baffle means which provide passages for the air, prevent channeling or short circuiting of the clay and air thereby permitting feasible air velocities to be used which do not stop the uniform counter flow of the clay, it is believed any worker in the art will have little trouble in designing the particular apparatus for his uses which incorporates the present invention and thereby permit him to carry out the present invention.

The rate of heat liberation per unit of time per unit of volume is a function of the mass velocity of adsorbent, of the amount of "carbon" to be burned therefrom, and of the mass velocity of the air. Experimentation has established that optimum conditions of burning occur in those ranges of mass velocities wherein the adsorbent is almost supported by the rising air, the upper limit being of course at air velocities so great that adsorbent of the size being burned will not fall, but will float. Since this velocity will vary with the apparent specific gravity of the clay, which apparent specific gravity is a function of the real specific gravity and the particle size, the limiting velocity is not a single velocity, but a range, defined as above. The inter-relation of adsorbent rate, "carbon," and air rate may be expressed best as that combination of rates, which in the case of fullers' earth, for example, while not exceeding about 1150° F. under conditions of operation, will remove carbon at the rate of about 0.3 to about 2.0 pounds per hour per cubic foot of chamber volume for a broad range of possible operation, and from about 0.5 to 1.5 pounds per hour per cubic foot of chamber volume for preferred operation. The mass velocity of heat transfer medium of course depends upon the specific heat and other characteristics of the medium. In operations where it is desirable to maintain the adsorbent at a relatively uniform temperature, the mass velocity is best defined as that mass velocity of heat exchange medium which will extract the required amount of heat while undergoing a temperature rise of not greater than about 50° F. and preferably of from 2° to 10°.

Figure 12:
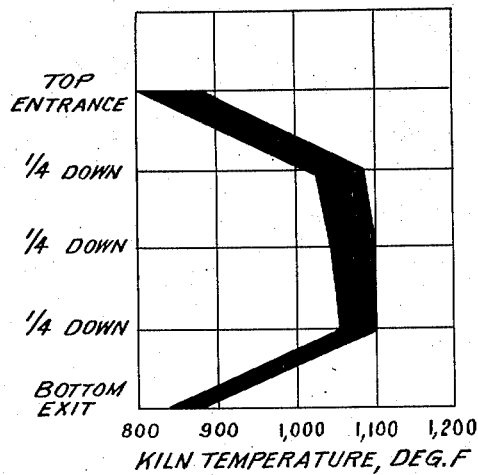
Fig. 12 is a graph showing temperature control with variation of combustible materials on the solids; and, Fig. 13 is a graph showing temperature control over a prolonged operation using substantially the same feed.
Figure 13:
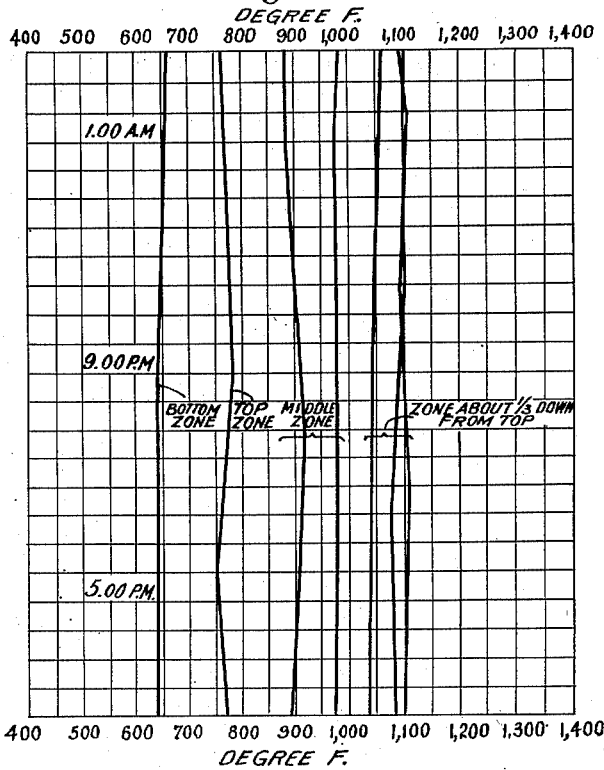

That the present process is capable of close temperature control is shown by the graphs presented in Figs. 12 and 13. Fig. 12 illustrates that the temperature can be maintained within very narrow limits even when the nature of the clay feed is altered drastically over short-time intervals. For the particular data of Fig. 12 the oil content of the feed clay was varied from 0 to 5% at 30 minute intervals with clay turnover in the kiln once each hour. The precise temperature control of which the process is capable is further illustrated in Fig. 13 which gives actual operating-temperature-curves for various clay zones in my kiln for a period of several hours during a full-scale commercial operation. In this particular operation the clay rate was 21 lbs./hr./cu. ft. of kiln volume and there was 7.2% of carbonaceous material on the unburned clay. The graph clearly shows that the temperatures in the various zones remained practically constant from 5 p. m. to 1 a. m. in an actual commercial operation.

Hereinabove it has been usually indicated that the temperature of burning should not rise above about 1150° F. This temperature is specific to materials of the nature of fuller's earth, and for different materials having different optimum regeneration temperatures, the proper specific temperature should be the basis of design and operation.

To show specific application of the above broad considerations of design, the following examples are given. Both are based upon regeneration of fuller's earth, 30–60 mesh, from percolation filtration of lubricating oil, using a molten salt heat exchange medium, the clay having been washed, steamed and removed from the filter in the usual manner, containing about 0.5% to 5.0% by weight of "carbon" and up to about 20% by weight of moisture. The dimensional relations are as shown below:

|  | Kiln A | Kiln B |
|---|---|---|
| Length of chamber | 10 feet | 13 feet. |
| Length of burning zone | 8 feet | 10 feet. |
| Length of heat exchange zones (preheated and after-cooler) | 1 foot | 1.5 feet. |
| Size heat transfer tubes | ½" std. pipe | ¾" std. pipe. |
| Spacing of tubes (triangular) | 1⅛" centers | 2½" centers. |
| Size of angle irons | 1¼₆ x ⅝₆ | 1" x 1". |
| Diameter of holes in angles | 0.46" | 0.60". |
| Volume of chamber occupied by clay | 50% | 51%. |
| Hydraulic radius for heat transfer | 0.53" | 0.83". |
| Air clay contact surface (sq. inches/cubic inches clay) | 1.89 | 1.09. |
| Maximum coke burning rate (#/hour/cubic foot of chamber) | 0.60 | 0.61. |
| Maximum clay thruput to burn 3% of coke (#/hour/cu. ft. of chamber) | 23 | 19. |
| Pressure drop of air for above rate | 30" water | 19" water. |

The enormous difference in size between an apparatus such as shown in Fig. 5 for carrying out my process and a conventionally used multiple hearth furnace, both of which have a capacity of around 50 tons of clay per day, may be seen from the following data:

|  | My kiln | Multiple hearth kiln |
|---|---|---|
| Height...............feet.. | 22 | 25 |
| Diameter............do.... | 3½ | 16 |
| Weight.............pounds.. | 25,000 | 500,000 |
| Burning surface.......sq. ft.. | 1,980 | 970 |

Thus it will be seen the multiple hearth furnace has a diameter nearly 5 times greater and a weight 20 times greater. Moreover the above data shows that per unit volume the contacting surface of my kiln is about 50 times that of the multiple hearth kiln which explains the tremendous capacity of my kiln with respect to its size.

Certain items of interest may be noted. The maximum pressure drop for air in designs having about 50% of the volume occupied by clay is about 3 inches of water per foot of chamber when operating near atmospheric pressure. The amount of air used is about 10% or more in excess of that theoretically required. At burning temperatures of about 1000–1050° F. the temperature control is easy and positive and no portion of the clay need rise above 200° F. higher than the temperature of the heat transfer medium.

The gain in filtration efficiency that may be derived from use of my method for regenerating filter clays is revolutionary in amount and its superiority over conventional methods is believed best shown by the tabular data set forth in the following Table I, wherein clays burned on a commercial scale by my present method are compared in percolation decolorizing efficiency of various typical oils with clays burned in one of the best type of equipment at present available, the clay being used to exhaustion in percolation prior to each burn and being drained, washed, and strained as understood in the art. (Fresh burned clay was considered as 100% efficient.)

Table I

|  | Decolorization of Pa. chlorex refined long residuum | | Decolorization of Pa. short residuum | | Decolorization of Pa. chlorex ref. short residuum | |
|---|---|---|---|---|---|---|
|  | My process, decol. eff. | Multiple hearth kiln, decol. eff. | My process, decol. eff. | Multiple hearth kiln, decol. eff. | My process, decol. eff. | Multiple hearth kiln, decol. eff. |
|  | Percent | Percent | Percent | Percent | Percent | Percent |
| Fresh burned | 100 | 100 | 100 | 100 | 100 | 100 |
| 1 | 102 | 88 | 108 | 98 | 114 | 92 |
| 2 | 107 | 93 | 102 | 79 | 114 | 72 |
| 3 | 104 | 66 | 109 | 72 |  | 57 |
| 4 |  | 55 | 103 | 70 | 111 | 55 |
| 4 | 108 | 59 | 99 | 57 | 106 | (Discarded) |
| 6 | 108 | (Discarded) | 99 |  | 110 |  |
| 7 |  |  | 100 |  | 100 |  |
| 8 | 98 |  | 97 |  | 113 |  |
| 9 |  |  | 96 |  | 105 |  |
| 10 | 105 |  | 102 |  | 93 |  |
| 11 |  |  | 95 |  | 97 |  |
| 12 |  |  | 92 |  | 99 |  |
| 13 | 99 |  | 96 |  |  |  |
| 14 |  |  | 89 |  | 107 |  |
| 15 | 92 |  | 92 |  |  |  |
| 16 |  |  | 93 |  |  |  |
| 17 |  |  |  |  | 105 |  |
| 18 | 94 |  | 92 |  |  |  |
|  | (Apparently usable indefinitely.) |  | (Apparently usable indefinitely.) |  | (Apparently usable indefinitely.) |  |
| Aver. eff. | Approx. 100 or higher for 18 burns. | 72½ for 5 burns. | App. 100 for 18 burns. | 75½ for 5 burns. | App. 100 for 18 burns. | 69¼ for 4 burns. |

|  | Decolorization of coastal acid refined distillate | | Decolorization of Mid-Contient Duo Sol refined short residuum | |
|---|---|---|---|---|
|  | My process, decol. eff. | Multiple hearth kiln, decol. eff. | My process, decol. eff. | Multiple hearth kiln, decol. eff. |
|  | Percent | Percent | Percent | Percent |
| Fresh burned | 100 | 100 | 100 | 100 |
| 1 | 104 | 88 | 107 | 89 |
| 2 | 99 | 80 | 108 | 84 |
| 3 | 99 | 73 | 108 | 73 |
| 4 | 97 | 70 | 107 | 70 |
| 5 | 94 | 63 | 101 | 62 |
| 6 | 105 | 62 | 107 | 64 |
| 7 | 107 | 56 | 98 | 56 |
| 8 | 99 | 54 |  | 57 |
| 9 | 94 | 53 | 96 | 56 |
| 10 | 103 | 50 | 102 | 50 |
|  | (Apparently usable indefinitely) | (Discarded) | (Apparently usable indefinitely) | (Discarded) |
| Average efficiency for 10 burns | 100.1 | 64.9 | Approx. 100 | 66.1 |

Thus it will be seen from the above table that a revolutionary improvement is obtained by the use of my method, i. e., the efficiency of the clay regenerated by my method is substantially higher than clay which has been regenerated the same number of times in conventional kilns, in fact, clay regenerated by my commercial scale process has lost hardly any of its original efficiency even after 18 burns while the other clay is ready to be thrown away after 5 burns. Thus it will be noted the decolorizing efficiency of clay after 5 regenerations in the multiple hearth burner is reduced to around 50-55% of that of fresh burned (new) clay, and, therefore, ready to be thrown away. The average efficiency of these No. 1 to No. 5 clays is around 70% on the same basis. On the other hand starting with fresh clay and conducting regenerations by my method, the efficiency of clay after even 18 regenerations is still around 95-100% and the average efficiency of No. 1 to No. 18 clays is approximately 100%. Since a value was not obtained for every burn, the exact average efficiency is not available, however, it can be seen that the average would be around 100% or even higher in some cases. The tremendously decreased "clay cost" which results by use of my process is obvious from the above. Thus it would appear that the clays may be efficiently regenerated forever by my process. There is a purely mechanical loss of clay, however, from handling in apparatus now used which amounts to about 2% per burn so that after about 50 burns all of the original clay would be lost in this manner. It is to be further noted that the prior art operates at an average efficiency of around 70% while I operate at an average efficiency of around 100%. Therefore, in the filtering step alone, I obtain around 30% increased efficiency for the year's operation. It will also be noted that in some instances the efficiency of my regenerated clay is above 100%. The probable reason for this is because the particular fresh burned clay was not initially prepared most efficiently and when carefully regenerated with proper control throughout, as provided by my process, the regenerated clay is more efficient than when freshly prepared.

In addition to the important advantage of positive temperature control whereby clay is reactivated to higher efficiency than that obtained by the prior art, as set forth above, the present method has several other distinct advantages over the commonly used methods. Not the least of these advantages is the fact higher throughput of clay per unit volume of burner is possible. I have varied the rate of clay throughput in my apparatus from 16 lbs./hr./cu. ft. of kiln volume to 75 lbs./hr./cu. ft. of kiln volume without any marked effect on the degree of reactivation. In certain cases the throughput is 15 to 30 times that of present multiple hearth burners. Quite obviously a distinct improvement is afforded by this increased throughput rate in substantially reducing the time required to regenerate large batches of clay. The following data clearly demonstrates this advantage on clays of equal carbonaceous content.

| Applicant's burner | | Multiple hearth burner | |
| --- | --- | --- | --- |
| Clay feed rates, lbs./cu. ft./hr. | Effective burning surface, sq. ft./cu. ft. | Clay rate, lbs./1 cu. ft./hr. | Effective burning surface, sq. ft./cu. ft. |
| 20.0 | 5.2 | 0.6 | .15 |

A further advantage of the present method is the fact it may be carried out in an apparatus which has no moving parts except the pump for circulating the heat exchange medium. This not only makes construction and operation much simpler but considerably reduces the expense as compared, for example, to the commonly used multiple hearth burners wherein the rabble arms are rotated.

Another important feature of the present invention is the efficient utilization of the heat developed in burning. More heat is developed by burning most spent clays than is required and in my process the combustion is conducted so efficiently that no additional fuel need be added in the usual case, in fact, in the usual case of regenerating spent petroleum filter clays, heat is extracted by my process, being taken up by the liquid heat exchange medium and may be used for other purposes. Since the reaction is exothermic this is only as it should be, however, in every other process now in use heat must be added during the regeneration. For instance, the utilization of the heat developed by burning in the commonly used burners such as the multiple hearth type burner is so poor due to the amount of air used, loss to surroundings, etc., that additional fuel is added to burn off the impurities, the cost of this additional fuel for one average size refinery alone may be as high as $20,000 per year.

In the claims where I speak of solid particles or granules I mean to include as a part of the particles or granules any solid or liquid matter that might be adhering to same as, for example, the solid or liquid petroleum matter adhering to spent clay.

I claim:

1. A method of regenerating spent particles of petroleum percolation clay and similar petroleum percolation filtering material by burning off the petroleum matter thereon with air which comprises flowing the spent particles under regenerating conditions through a regenerating zone of sufficient length to afford proper treating time, flowing approximately the theoretical amount of air required to burn off said petroleum matter countercurrently through the zone in direct contact with the flowing particles so as to effect the burning of the petroleum matter, and flowing a sufficient amount of a liquid heat exchange medium, maintained in a temperature range between the minimum combustion temperature and the maximum combustion temperature that does not cause substantial heat damage to the particles, within sufficiently close indirect heat exchange to all the particles in said zone that they are not over about 1½ inches from a heat transfer surface controlled by said liquid heat exchange medium, so that the liquid heat exchange medium extracts heat from the particles undergoing combustion and maintains their temperature closely within said temperature range.

2. A method of regenerating spent particles of petroleum percolation clay and the like by burning off the petroleum matter thereon with air within a closely controlled combustion temperature range which comprises gravitating the spent particles as a substantially solid column of particles under combustion conditions through a regenerating zone of sufficient length to afford proper regenerating time, flowing air upwardly through the zone in direct contact with the gravitating particles by way of substantially continuous paths formed therefor through the particles so that the air does not force its way through the flowing particles in any substantial portion of the zone, the amount of air used being limited to approximately the theoretical amount required for burning off said petroleum matter, and extracting heat from the particles being regenerated in order to control their temperature by flowing a sufficient amount of liquid heat exchange medium, maintained around 900° F., within sufficiently close indirect heat exchange to all the particles in said zone that they are not over about 1½ inches from a heat transfer surface controlled by said liquid heat exchange medium so that the temperature of said particles is maintained closely within a combustion temperature range between the minimum combustion temperature and a top temperature of about 1150° F. whereby the particles are not substantially heat damaged.

3. A method of regenerating spent adsorbent particles of contact material such as clay and the like contaminated with combustible impurities by reaction with a combustion-supporting gas within a closely controlled combustion temperature range which comprises gravitating the particles as a substantially solid column of particles under combustion conditions through a combustion zone of sufficient length to afford proper regenerating time, flowing the combustion-supporting gas upwardly through the zone in direct contact with the gravitating particles by way of paths formed therefor so that the gas does not force its way through any substantial region of particles, and flowing a sufficient amount of liquid heat exchange medium, maintained within a combustion temperature range between the minimum combustion temperature and the maximum combustion temperature that does not cause substantial heat damage to the particles, within sufficiently close indirect heat exchange to all the particles in said zone that they are not over about 1½ inches from a heat transfer surface controlled by said liquid heat exchange medium whereby the temperature of said particles is maintained closely within said combustion temperature range.

4. A method of increasing the activity of adsorbent particles of contact material such as clay and the like carrying carbonaceous matter by carbonizing the carbonaceous matter on the particles by reaction with a gaseous agent within a closely controlled, elevated carbonizing temperature range that is between the minimum carbonizing temperature and the maximum carbonizing temperature that does not cause substantial heat damage to the particles, which comprises gravitating the particles as a substantial solid column of particles under carbonizing conditions through a carbonizing zone of sufficient length to afford proper carbonizing time, flowing a gaseous agent of restricted oxygen content, which is capable of carbonizing said carbonaceous matter, upwardly through the zone in contact with the particles so as to form an active carbon layer on said particles by carbonizing at least a portion of said carbonaceous matter thereon, baffling the gravitating particles in such manner as to form paths for the gaseous agent so that it passes through the zone in direct contact with the particles but without forcing its way through any substantial region of unbaffled particles, and flowing a sufficient amount of liquid heat exchange medium, maintained within approximately said carbonizing temperature range, within sufficiently close indirect heat exchange to all particles in said zone that the temperature of said particles is maintained closely within said temperature range.

5. A method of treating adsorbent particles of contact material such as clay and the like with a gaseous agent within a given elevated treating temperature range that is closely controlled which comprises gravitating the particles as a substantially solid column of particles under treating conditions through a treating zone of sufficient length to afford proper treating time, flowing the gaseous agent upwardly through the zone in direct contact with the particles, baffling the gravitating particles in such manner as to form paths for the gaseous agent so that it passes through the zone in direct contact with the particles but without forcing its way through any substantial region of unbaffled particles, and flowing a sufficient amount of liquid heat exchange medium, maintained within approximately said temperature range, within sufficiently close indirect heat exchange to all the particles in said zone that the temperature of said particles is maintained closely within said temperature range.

6. A method of treating solid particles with a gaseous agent within a given elevated treating temperature range that is closely controlled which comprises flowing the particles under treating conditions through a treating zone of sufficient length to afford proper treating time, flowing the gaseous agent countercurrently through the zone in direct contact with the flowing particles by way of paths formed therefor so that the gaseous agent does not force its way through any substantial depth of particles, and flowing a sufficient amount of a liquid heat exchange medium, maintained within approximately said temperature range, within sufficiently close indirect heat exchange to all the particles in said zone that they are not over about two inches from a heat transfer surface controlled by said liquid heat exchange medium whereby the temperature of said particles is maintained closely within said temperature range.

7. A method of reacting solid particles with a gaseous agent within a given elevated reacting temperature range that is closely controlled which comprises gravitating the particles as a substantially solid column of particles under reacting conditions through a reacting zone of sufficient length to afford proper reacting time, flowing the gaseous agent upwardly through the zone in direct contact with the particles to effect said reaction, baffling the gravitating particles in such manner as to form paths for the gaseous agent so that it passes through the zone in direct contact with the particles but without forcing its way through any substantial region of unbaffled particles, and flowing a sufficient amount of a liquid heat exchange medium, maintained within approximately said temperature range, within sufficiently close indirect heat exchange to all the particles in said zone that the temperature of said particles is maintained closely within said temperature range.

8. A method of regenerating spent adsorbent particles of a clay-type contact material contaminated with carbonaceous impurities by burning off the impurities with air which comprises flowing the spent particles as a substantially solid column of particles under combustion conditions downwardly through a regenerating zone of sufficient length to afford proper regenerating time, flowing the air countercurrently through the zone in direct contact with the particles so as to burn off the carbonaceous matter thereon, baffling the flowing particles in such manner as to form substantially continuous, particle-free paths for the air through the downwardly flowing particles so that the air passes through the zone in direct contact with particles but without forcing its way through any substantial region of unbaffled particles, and flowing a sufficient amount of a liquid heat exchange medium, maintained within a combustion temperature range between the minimum combustion temperature and the maximum combustion temperature that does not cause substantial heat damage to the particles, within sufficiently close indirect heat exchange to all the particles in said zone that the temperature of said particles is maintained closely within said combustion temperature range.

9. A method of treating solid particles in the presence of a gaseous agent within a given elevated treating temperature range that is closely controlled which comprises gravitating particles under treating conditions through a substantially vertical treating zone of sufficient length to afford proper treating time, flowing the gaseous agent upwardly through the zone in direct contact with the particles, baffling the gravitating particles in such manner as to form substantially continuous, particle-free paths for the gaseous agent through the flowing particles so that the gaseous agent flows through the zone in direct contact with the particles but without forcing its way through any substantial region of unbaffled particles, and flowing a sufficient amount of a liquid heat exchange medium, maintained within approximately said temperature range, within sufficiently close indirect heat exchange to all the particles in said zone that the temperature of said particles is maintained closely within said temperature range.

JOHN W. PAYNE.